United States Patent Office 3,281,499
Patented Oct. 25, 1966

3,281,499
BLOCK COPOLYMERS CONTAINING AN INTERIOR SEGMENT OF OXYMETEHYLENE POLYMER AND POLYMERS OF ETHYLENICALLY UNSATURATED MONOMERS AS EXTERIOR SEGMENTS
Thomas Joseph Dolce, Summit, and Dagobert Engelbert Stuetz, Metuchen, N.J., and William John Roberts, Berwyn, Pa., assignors to Celanese Corporation of America, New York, N.Y., a corporation of Delaware
No Drawing. Filed Feb. 27, 1962, Ser. No. 176,124
14 Claims. (Cl. 260—874)

This invention relates to new oxymethylene polymers and a method of making them.

Polyoxymethylene polymers, having recurring

—CH$_2$O— units have been known for many years. They may be prepared by the polymerization of anhydrous formaldehyde or by the polymerization of trioxane which is a cyclic trimer of formaldehyde. Polyoxymethylene varies in molecular weight, depending on its method of preparation.

High molecular weight solid polyoxymethylenes have been prepared by polymerizing trioxane in the presence of certain fluoride catalysts such as antimony fluoride and may also be prepared in high yields and at rapid reaction rates by the use of catalysts comprising boron fluoride coordination complexes with organic compounds, as described in Patent No. 2,989,605 of Donald E. Hudgin and Frank M. Bernadinelli. Boron fluoride gas is also a rapid and effective catalyst, as disclosed in Patent No. 2,989,507 of also Hudgin and Berardinelli. A group of oxymethylene polymers containing repeating carbon-to-carbon single bonds in the polymer chain prepared for example by copolymerizing trioxane and any of various cyclic ethers such as ethylene oxide or dioxolane is disclosed in U.S. Patent 3,027,352 issued March 27, 1962 to Walling et al.

Other methods of preparing oxymethylene polymers are disclosed by Kern et al. in Angewandte Chemie 73 (6) 177–186 (March 21, 1961), including polymers containing repeating carbon-to-carbon single bonds in the polymer chain by copolymerizing trioxane with cyclic ethers such as dioxane, lactones such as beta-propiolactone, anhydrides such as cyclic adipic anhydride and ethylenically unsaturated compounds such as styrene, vinyl acetate, vinyl methyl ketone, acrolein etc.

Also known in the art, e.g. as described in the Kern et al. article cited above, are oxymethylene polymers the end groups of which are reacted or "capped" with a carboxylic acid, e.g. an alkanoic acid such as acetic acid to form ester end groups or with a monomeric ether, e.g. a dialkyl ether such as dimethyl ether to form ether end groups.

While resinous oxymethylene polymers such as those described above are satisfactory in many applications, there exist uses for which it is desirable to modify certain of their properties. For example, it may be desirable in some instances to increase their resistance to degradation caused by various factors, e.g. heat and/or ultra violet radiation, to increase their melting or softening points and solubility in organic solvents, or to improve their receptivity to dyes, their moisture resistance or their electrical properties.

It is an object of this invention to provide oxymethylene polymers having modified properties. It is a further object of this invention to provide a process of treating an oxymethylene polymer whereby a new oxymethylene polymer is obtained having modified properties.

In accordance with one aspect of the invention, a preformed oxymethylene polymer is reacted with an ethylenically unsaturated monomer to obtain a reaction product. For example, the reaction product may be a block polymer, the molecules of which have a segment of the main polymer chain corresponding to the molecules of the preformed oxymethylene polymer, e.g. a segment containing a major proportion of oxymethylene units, and at least one segment of a polymerized ethylenically unsaturated compound, i.e., containing only carbon in the polymer chain. Suitably only a single ethylenically unsaturated monomer is used such that the segments of polymerized unsaturated compounds contain only a single type of polymerized unit.

It is preferred that the preformed oxymethylene polymer not be capped with acetate or methyl ether groups, so that both ends of each polymer molecules are susceptible to receive segments of polymerized unsaturated monomer, resulting in an interior oxymethylene polymer segment in the final polymer chain and end segments of polymerized unsaturated monomer. Partially capped oxymethylene polymer may also be used as the preformed polymer, in which case the oxymethylene polymer molecule generally have only one end to which is bonded a segment of polymerized unsaturated monomer.

A preferred group of polymers intended to be utilized as the preformed oxymethylene polymer are those containing carbon-to-carbon single bonds in the main polymer chain and, particularly, oxymethylene-cyclic ether copolymers having a structure comprising recurring units having formula (—O—CH$_2$—(C)$_n$—) wherein $n$ is an integer from zero to 5 and wherein $n$ is zero in from 60 to 99.6 percent of the recurring units.

A preferred class of copolymers which may be utilized as the preformed polymer structure comprising recurring units having the formula (—O—CH$_2$—(CH$_2$)$_n$—) wherein $n$ is an integer from zero to 2 and wherein $n$ is zero in from 60 to 99.6 percent of the recurring units. These copolymers are prepared by copolymerizing trioxane with a cyclic ether having the structure

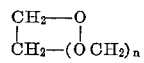

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran and butadiene monoxide.

The preferred catalysts used in the preparation of the preformed oxymethylene polymer are the boron fluoride coordinate complexes with organic compounds in which oxygen or sulfur is the donor atom.

The coordination complexes of boron fluoride may, for example, be a complex with a phenol, an ether, an ester, or a dialkyl sulfide. Boron fluoride dibutyl etherate, the coordination complex of boron fluoride with dibutyl ether, is the preferred coordination complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordination complex of boron fluoride should be present in the polymerization zone for the preparation of the preformed oxymethylene polymer in amounts such that its boron fluoride content is between about 0.001 and about 2.0 weight percent based on the weight of the monomers in the polymerization zone. Preferably, amounts between about 0.003 and about 0.1 weight percent should be used.

The monomers used in the preparation of the preformed oxymethylene polymer are preferably anhydrous or substantially anhydrous. Small amounts of moisture, such as may be present in commercial grade reactants or may be introduced by contact with atmospheric air will not prevent polymerization, but should be essentially removed for best yields.

In a specific embodiment of the preparation of the preformed oxymethylene polymer, trioxane, cyclic ether and catalyst are dissolved in a common anhydrous solvent, such as cyclohexane and permitted to react in a sealed zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of the cyclic ether other than trioxane used in the preparation of the preformed oxymethylene polymer generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must be also be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether may be present in the reaction mixture for the preparation of the preformed oxymethylene in amounts between about 0.2 and about 30 mol percent, based on the total mols of monomer. The optimum proportion will depend on the particular copolymer desired, the expected degree of conversion and the chemical constitution of the cyclic ether used.

The preformed oxymethylene copolymers produced from the preferred cyclic ethers have a structure substantially composed of oxymethylene and oxyethylene groups in a ratio from about 250:1 to about 1.5:1.

Upon completion of the preparation of the preformed oxymethylene polymer it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Patent 2,989,509 issued June 20, 1961 to Donald E. Hudgin and Frank M. Berardinelli. In general, preformed oxymethylene polymers containing terminal hydroxyl groups are particularly suitable for utilization under this invention. The preformed oxymethylene polymer may, for example, have a molecular weight of 6,000 to 50,000 corresponding to an inherent viscosity of about 0.8 to 3.0 determined as described below.

The preformed oxymethylene polymers contemplated under this invention are generally of high molecular weight and moldable, i.e., capable prior to further polymerization of the ethylenically unsaturated monomer of being formed into shaped structures such as moldings, sheets and films by conventional techniques of compression molding, injection molding, extrusion, blow molding, casting, etc. After further reaction with ethylenically unsaturated monomer, the final product retains the foregoing properties and in addition, has certain properties, e.g., thermal stability and melting range which are improved over those of the initial polymer.

Some ethylenically unsaturated monomers which may be reacted with the preformed oxymethylene polymer in accordance with this invention are for example, vinyl-substituted hereo-N-cyclic compounds e.g., N-vinyl-2-pyrrolidone and the vinyl pyridines, ethylenically unsaturated amides, e.g. alkenyl carboxylic acid amides such as acrylamide and methacrylamide, vinyl esters of carboxylic acids, e.g. vinyl alkanoates such as vinyl acetate, unsaturated carboxylic acid nitriles, e.g., alkenyl carboxylic acid nitriles such as acrylonitrile and methacrylonitrile, alkyl esters of unsaturated carboxylic acids, e.g. alkyl alkenoates such as alkyl acrylates e.g. methyl acrylate, alkyl methacrylates e.g. methyl methacrylate, ethylenically unsaturated aromatic hydrocarbons, e.g. aryl alkenes such as stryrene, and unsaturated ethers, e.g. alkyl vinyl ethers such as n-butyl vinyl ether. Ethylenically unsaturated monomers containing no active hydrogen as determined by the Zerewitinoff method are completely suitable for used under the invention. Preferably the unsaturated monomers is monoethylenically unsaturated. The final product may contain for example 1 to 50% by weight of the polymer of segments of polymerized unsaturated monomer.

The reaction of the performed oxymethylene polymer and the ethylenically unsaturated monomer is perferably carried out under conditions such that at least a portion of the oxymethyl polymer molecules are converted into polymeric free radicals. Thus one may use a catalyst which converts hydroxyl-bearing carbon atoms to free radical ends. Preferred catalysts are ceric compounds, i.e., compounds wherein the cerium has a valence of +4. Some contemplated ceric compounds are ceric salts such as tetra-ammonium ceric sulfate,

ceric ammonium nitrate, $(NH_4)_2Ce(NO_3)_6$, basic ceric nitrate, $Ce(OH)(NO_3)_3 \cdot 3H_2O$, and ceric sulfate,

The catalyst may be used, for example in an amount of .1 to 2.5% based on the weight of the total reaction charge.

In place of or in addition to the fill-radical yielding catalyst, ultra-violet radiation may be used to generate free radicals in situ, in accordance with procedures well known in the art.

In carrying out the reaction between the preformed oxymethylene polymer and the ethylenically unsaturated compound, it is desirable to exclude oxygen from the reaction zone, e.g. by using a blanket of an inert gas such as nitrogen or argon. The reaction may be carried out for example at a temperature of 20 to 90° C., and room temperature is suitable in many instances. Since the pressure is not critical to the reaction, atmospheric may be conveniently employed.

A suitable method of carrying out the reaction is to slurry the preformed oxymethylene polymer in a nonsolvent for the polymer, e.g. water, anisole, cyclohexane or benzene, and then add the ethylenically unsaturated monomer and the catalyst, e.g. a ceric salt dissolved in aqueous nitric acid. Stirring is ordinarily used during the reaction. In the case of unsaturated monomers which are gases under the conditions of reaction, the monomer may be bubbled into the slurry of oxymethylene polymer. In the latter case, the gaseous effluent from the reaction zone may be treated to separate unreacted monomer which may then be recycled to the reaction zone.

The reaction may also be carried out in solution phase using a solvent for the preformed oxymethylene polymer, e.g. dimethyl formamide, benzylalcohol and gamma-butyrolactone.

The period of reaction may be varied for example, within a range of 1 to 3 hours.

The following examples further illustrate the invention.

Example I

Ten grams of a copolymer of trioxane and dioxolane which was prepared with the aid of a boron trifluoride catalyst and which contained 1.6% of combined dioxolane based on the weight of the copolymer and had an inherent viscosity of 1.6 (measured at 60° C. from a solution containing 0.1 weight percent of polymer in p-chlorophenol containing 0.1 weight percent of polymer in p-chlorophenol containing 2 weight percent of alpha-pinene), was slurried in 75 ml. of deionized water in a reaction vessel at room temperature. Five ml. of vinyl acetate were added followed by 2 ml. of 0.1 molar solution $(NH_4)_4Ce(SO_4)_4$ in 1 molar aqueous $HNO_3$ to yield a mixture substantially free of trioxane or formaldehyde at the beginning of the reaction.

The reaction was blanketed with nitrogen and continued at room temperature for 3½ hours with stirring. The resulting polymer product was filtered, washed with water and dried in vacuo at 55° C. The product showed a net gain in weight of 30% based on the weight of the initial trioxane-dioxane copolymer.

The polymer was stabilized by milling it at 200° C. for 30 minutes with 0.5% of malonamide and 0.5% of 2,2'-methylene bis (4-methyl-6-tert.-butyl phenol) based on the weight of polymer. It was then found to have a crystalline melting point of 174° C. determined on a Kofler Hot Stage Microscope, and was soluble in tolune at 50° C. and partly soluble in dimethyl formamide at room temperature. The average thermal degradation rate of the stabilized polymer over a period of 45 minutes was .03 percent loss of weight per minute when maintained in an open vessel in a circulating air over at 222° C., measured without removing the sample from the oven.

When the initial trioxane-dioxolane copolymer was stabilized as described above, its crystalline melting point was 160° C. and its average thermal degradation rate determined as described above was 0.04% loss of weight per minute. Moreover, the preformed trioxane copolymer was insoluble in toluene at 50° C. or in dimethyl formamide at room temperature.

Example II

The procedure of Example I was followed except that 5 grams of methyl metacrylate were used as the unsaturated compound in place in vinyl acetate. The resulting polymer showed a net gain in weight of 21% based on the weight of the initial preformed copolymer and had a softening point of 189° C. The average thermal degradation rate at 222° C. of the stabilized product was 0.02% per minute.

Example III

The procedure of Example I was repeated except that the unsaturated compound used was 5 grams of acrylonitrile. The product showed a net gain in weight of 28% based on the weight of the preformed polymer and had a softening point of 220° C.

Example IV

The procedure of Example I was followed except that the unsaturated compound was 5 grams of acrylamide. The product showed a net gain in weight of 11% based on the weight of the preformed polymer and had a softening point of 189° C.

Example V

The procedure of Example I was used except that the unsaturated compound employed was 5 grams of acrolein. The product showed a net gain in weight of 4% and had a crystalline melting point of 170° C.

Example VI

The procedure of Example I was followed except that the unsaturated compound used was 5 grams of styrene. The product showed a net gain in weight of 1% and had a crystalline melting point of 172° C.

Example VII

One hundred grams of a homopolymer of trioxane made in the presence of boron fluoride catalyst and having an inherent viscosity of 1.1 determined as described in Example I was slurried with 50 grams of acrylamide in 1000 ml. of anisole. To this were added 40 ml. of a 0.1 molar $(NH_4)_4Ce(SO_4)_4$ solution in 1 molar aqueous $HNO_3$. With stirring and under a nitrogen blanket, the mixture was heated to 75° C. and maintained at that temperature for one hour. After this period the polymer was collected, washed twice with acetone containing a small amount of tributylamine, three times with water and finally twice more with acetone. After drying, the polymer which contained 0.07% by weight of nitrogen, had a thermal degradation rate of 2.7% per minute determined as described in Example I. In comparison the initial trioxane homopolymer had an average thermal degradation rate of 7.8% per minute.

Example VIII

Fifty grams of a trioxane homopolymer prepared as described in Example VII and having an inherent viscosity of 1.3 determined as described in Example I were slurried with 50 grams of N-vinyl-2-pyrrolidone in 1000 ml. of deionized water in a reaction vessel. To this were added 20 ml. of 0.1 molar $(NH_4)_4Ce(SO_4)_4$ solution in 1 molar $HNO_3$. The reaction mass was stirred under a nitrogen blanket at room temperature for 90 minutes after which the polymer was separated and washed twice with 500 ml. portions of 0.04 molar sodium hydroxide solution in water, twice with dionized water, and twice with acetone and dried overnight at 65° C. The polymer contained 0.50–0.06% by weight of nitrogen.

The polymer was stabilized as described in Example I and during the milling 13% of the polymer was lost. The final polymer had an average thermal degradation rate of 0.38% loss of weight per minute determined as described in Example I.

When the preformed trioxane homopolymer of this example was stabilized as described in Example I, 34% of the polymer was lost during the milling and the stabilized polymer had an average thermal degradation rate of 0.64% loss of weight per minute.

It is to be understood that the foregoing detailed description is given merely by way of illustration and that many variations may be made therein without departing from the spirit of my invention.

Having described our invention what we desired to secure by Letters Patent is:

1. A process for the preparation of high molecular weight moldable polymeric products comprising reacting
    (a) a polyacetal prepolymer having polymeric chains consisting essentially of a major proportion of recurring oxymethylene (—$CH_2O$—) units, said polymeric chains having a molecular weight of at least 6,000; and
    (b) a monoethylenically unsaturated compound
    in the presence of a free radical yielding compound
    to produce a polymeric product comprising (1) at least one polymeric chain segment consisting essentially of a major proportion of recurring oxymethylene (—$CH_2O$—) units, and directly chemically bonded thereto, (2) at least one polymeric chain segment consisting essentially of recurring units derived from said monoethylenically unsaturated compound.

2. The process of claim 1, wherein said free radical yielding compound comprises a ceric ion.

3. The process of claim 2, wherein said reaction is carried out in a liquid reaction medium at a temperature between about 20 and about 90° C.

4. A process for the preparation of high molecular weight moldable polymeric products comprising reacting
(a) a polyacetal prepolymer having polymeric chains consisting essentially of a major proportion of recurring oxymethylene (—CH$_2$O—) units and a minor proportion of recurring oxyalkylene units, said alkylene moieties having up to about 5 carbon atoms, and said polymeric chains having a molecular weight of at least 6,000 up to about 50,000; and
(b) a monoethylenically unsaturated vinylidene compound
in the presence of a free radical catalyst
to produce a polymeric product comprising (1) at least one polymeric chain segment consisting essentially of a major proportion of recurring oxymethylene (—CH$_2$O—) units, and a minor proportion of oxyalkylene units wherein the alkylene moiety has up to about 5 carbon atoms, and directly chemically bonded thereto, (2) at least one polymeric chain segment consisting essentially of recurring units derived from said monoethylenically unsaturated vinylidene compound.

5. The process of claim 1 wherein said preformed oxymethylene polymer has a structure comprising recurring units having the formula (—O—CH$_2$—(CH$_2$)$_n$—) wherein $n$ is an integer from zero to 5 and wherein $n$ is zero in from 60 to 99.6 percent of the recurring units.

6. The process of claim 1 wherein said preformed oxymethylene polymer is a copolymer of trioxane and a cyclic ether having at least two adjacent carbon atoms said copolymer containing from 60 to 99.6 mol percent of recurring oxymethylene units.

7. The process of claim 2 wherein said ceric compound is (NH$_4$)$_4$Ce(SO$_4$)$_4$.

8. A high colecular weight moldable polymeric product comprising (1) an interior polymeric chain segment consisting essentially of a major proportion of recurring oxymethylene (—CH$_2$O—) units, said polymeric chain having a molecular weight of at least 6,000, and directly chemically bonded to each terminus thereof (2) polymeric chain segments consisting essentially of recurring units derived from a monoethylenically unsaturated vinylidene compound, said vinylidene polymeric chain segments comprising at least 1 weight percent of said polymeric product.

9. A high molecular weight moldable polymeric product comprising (1) an interior polymeric chain segment consisting essentially of recurring units having the formula

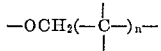

wherein $n$ is an integer from zero to 5 and wherein $n$ is zero in from 60 to 99.6 percent of the recurring units, said polymeric chain having a molecular weight of at least 6,000, and directly chemically bonded to each terminus thereof (2) polymeric chain segments consisting essentially of recurring units derived from a monoethylenically unsaturated vinylidene compound, said vinylidene polymeric chain segments comprising at least 1 weight percent up to about 50 weight percent of said polymeric product.

10. A high molecular weight moldable polymeric product comprising (1) an interior polymeric chain segment consisting essentially of recurring units having the formula —O—CH$_2$—(CH$_2$)$_n$— wherein $n$ is an integer from zero to 5 and wherein $n$ is zero in from 60 to 99.6 percent of the recurring units, said polymeric chain having a molecular weight of at least 6,000, and directly chemically bonded to each terminus thereof (2) polymeric chain segments consisting essentially of recurring units derived from a monoethylenically unsaturated vinylidene compound, said vinylidene polymeric chain segments comprising at least 1 weight percent of said polymeric product.

11. A high molecular weight moldable polymeric product comprising (1) an interior polymeric chain segment consisting essentially of a major proportion of recurring oxymethylene (—CH$_2$O—) units, and a minor proportion of oxyalkylene units wherein the alkylene moiety has up to about 5 carbon atoms, said polymeric chain having a molecular weight of at least 6,000, said polymeric segment being terminated at each end thereof with (2) polymeric chain segments consisting essentially of recurring units derived from a monoethylenically unsaturated vinylidene compound, said vinylidene polymeric chain segments comprising at least 1 weight percent of said polymeric product.

12. A high molecular weight moldable polymeric product comprising (1) an interior polymeric chain segment consisting essentially of a major proportion of recurring oxymethylene (—CH$_2$O—) units and from about 0.4 to about 40 oxyalkylene units per 100 of said recurring oxymethylene units, said alkylene moieties having up to about 5 carbon atoms, said polymeric chain having a molecular weight of at least 6,000, said polymeric segment being terminated at each end thereof with (2) polymeric chain segments consisting essentially of recurring units derived from an alkenyl acid amide, said recurring units comprising at least 1 up to about 50 weight percent of said polymeric product.

13. The product of claim 12, wherein said oxyalkylene units are —OCH$_2$CH$_2$— units and the ratio of said recurring oxymethylene units to said oxyethylene units is from about 1.5:1 to about 250:1.

14. A high molecular weight moldable polymeric product comprising (1) an interior polymeric chain segment consisting essentially of recurring oxymethylene (—CH$_2$O—) units and recurring oxyethylene (—OCH$_2$CH$_2$—)

units, the ratio of said recurring oxymethylene units to said oxyethylene units being from about 1.5:1 to about 250:1, said polymeric chain having a molecular weight of at least 6,000 up to about 50,000, said polymeric segment being terminated at each end thereof with (2) polymeric chain segments consisting essentially of recurring units derived from a monoethylenically unsaturated vinylidene compound selected from the group consisting of vinyl acetate, methyl methacrylate, acrylonitrile, acrylamide, acrolein, styrene and N-vinyl-2-pyrrolidone, said recurring units derived from said monoethylenically unsaturated vinylidene compound comprising at least 1 weight percent up to about 20 weight percent of said polymeric product.

References Cited by the Examiner
UNITED STATES PATENTS

| | | |
|---|---|---|
| 2,922,768 | 1/1960 | Mino et al. _____ 260—29.6 |
| 3,027,352 | 3/1962 | Walling et al. _____ 260—67 |

FOREIGN PATENTS 807,589    1/1959    Great Britain.

References Cited by the Applicant
UNITED STATES PATENTS

| | | |
|---|---|---|
| 2,373,561 | 4/1945 | Hanford. |
| 3,029,216 | 4/1962 | Bailey et al. |
| 3,050,511 | 8/1962 | Sware. |
| 3,079,357 | 2/1963 | Fischer. |
| 3,081,343 | 3/1963 | Merten. |
| 3,122,525 | 2/1964 | Kern et al. |
| 3,141,864 | 7/1964 | Rink. |

FOREIGN PATENTS 1,137,214    12/1958    Germany.

MURRAY TILLMAN, *Primary Examiner.*

E. B. WOODRUFF, *Assistant Examiner.*

UNITED STATES PATENT OFFICE
CERTIFICATE OF CORRECTION

Patent No. 3,281,499

October 25, 1966

Thomas Joseph Dolce et al.

It is hereby certified that error appears in the above numbered patent requiring correction and that the said Letters Patent should read as corrected below.

Column 3, line 9, after "sealed" insert -- reaction --; column 4, line 4, for "hereo-" read -- hetero- --; column 6, line 37, for "0.50-0.06%" read -- 0.05-0.06% --; column 7, line 35, for "colecular" read -- molecular --; column 8, line 24, after "alkenyl" insert -- carboxylic --.

Signed and sealed this 5th day of September 1967.

(SEAL)
Attest:

ERNEST W. SWIDER
Attesting Officer

EDWARD J. BRENNER
Commissioner of Patents